United States Patent [19]
Wölfges

[11] Patent Number: 4,809,746
[45] Date of Patent: Mar. 7, 1989

[54] PROPORTIONAL THROTTLE VALVE

[75] Inventor: Hans Wölfges, Lohr am Main, Fed. Rep. of Germany

[73] Assignee: Mannesmann Rexroth GmbH, Lohr am Main, Fed. Rep. of Germany

[21] Appl. No.: 894,282

[22] Filed: Aug. 7, 1986

[30] Foreign Application Priority Data

Aug. 10, 1985 [DE] Fed. Rep. of Germany ....... 3528781
Jul. 28, 1986 [DE] Fed. Rep. of Germany ....... 3625428

[51] Int. Cl.$^4$ .............................................. F16K 31/40
[52] U.S. Cl. ................................. 137/501; 137/486; 251/30.01; 251/44; 251/282
[58] Field of Search ...................... 137/503, 492.5, 501, 137/486; 251/282, 43, 30.01, 33, 41, 42, 44, 26

[56] References Cited

U.S. PATENT DOCUMENTS

| | | | |
|---|---|---|---|
| 1,719,686 | 7/1929 | Browne | 251/33 X |
| 2,420,370 | 5/1947 | Hamilton | 137/492.5 |
| 2,664,916 | 1/1954 | Conley | 251/44 X |
| 3,029,061 | 4/1962 | Hoxworth | 251/282 X |
| 3,102,550 | 9/1963 | Shand et al. | 251/282 X |
| 3,402,735 | 9/1968 | Kates | 137/501 |
| 3,545,887 | 12/1970 | Kobnick | 137/492.5 X |
| 3,593,741 | 7/1971 | Odenthal | 251/26 |
| 3,677,287 | 7/1972 | Morris | 251/43 X |
| 3,680,832 | 8/1972 | Uliczky | 251/282 |
| 3,684,238 | 8/1972 | Michellone et al. | 251/282 X |
| 3,892,384 | 7/1975 | Myers | 251/282 |
| 4,167,262 | 9/1979 | Lemmon | 251/282 X |
| 4,402,341 | 9/1983 | Reip | 251/282 X |
| 4,557,287 | 12/1985 | Laufer | 137/115 |

FOREIGN PATENT DOCUMENTS

2750502 11/1982 Fed. Rep. of Germany .
18289 of 1907 United Kingdom ................. 251/42

*Primary Examiner*—Stephen Hepperle
*Attorney, Agent, or Firm*—Harness, Dickey & Pierce

[57] ABSTRACT

A proportional throttle valve which varies the throttle cross-sectional area in dependence upon a control signal and thus governs the flow rate. The invention relates to a throttle valve in which the position of the valve member remains constant independent of pressure fluctuations upstream and downstream of the throttle cross-section. For this purpose the pressure acts on equisized opposing faces of the valve member. An annular face of equal magnitude lying opposite the control face is subjected to the pressure in a line leading from the pressure-limiting valve for setting the control pressure to the tank so that pressure fluctuations in this tank line cause corresponding variations of the control pressure and the position of the valve member remains constant.

12 Claims, 3 Drawing Sheets

PROPORTIONAL THROTTLE VALVE

BACKGROUND OF THE INVENTION

The invention relates to a proportional throttle valve having the features set forth in the preamble of claim 1.

Figure 2:
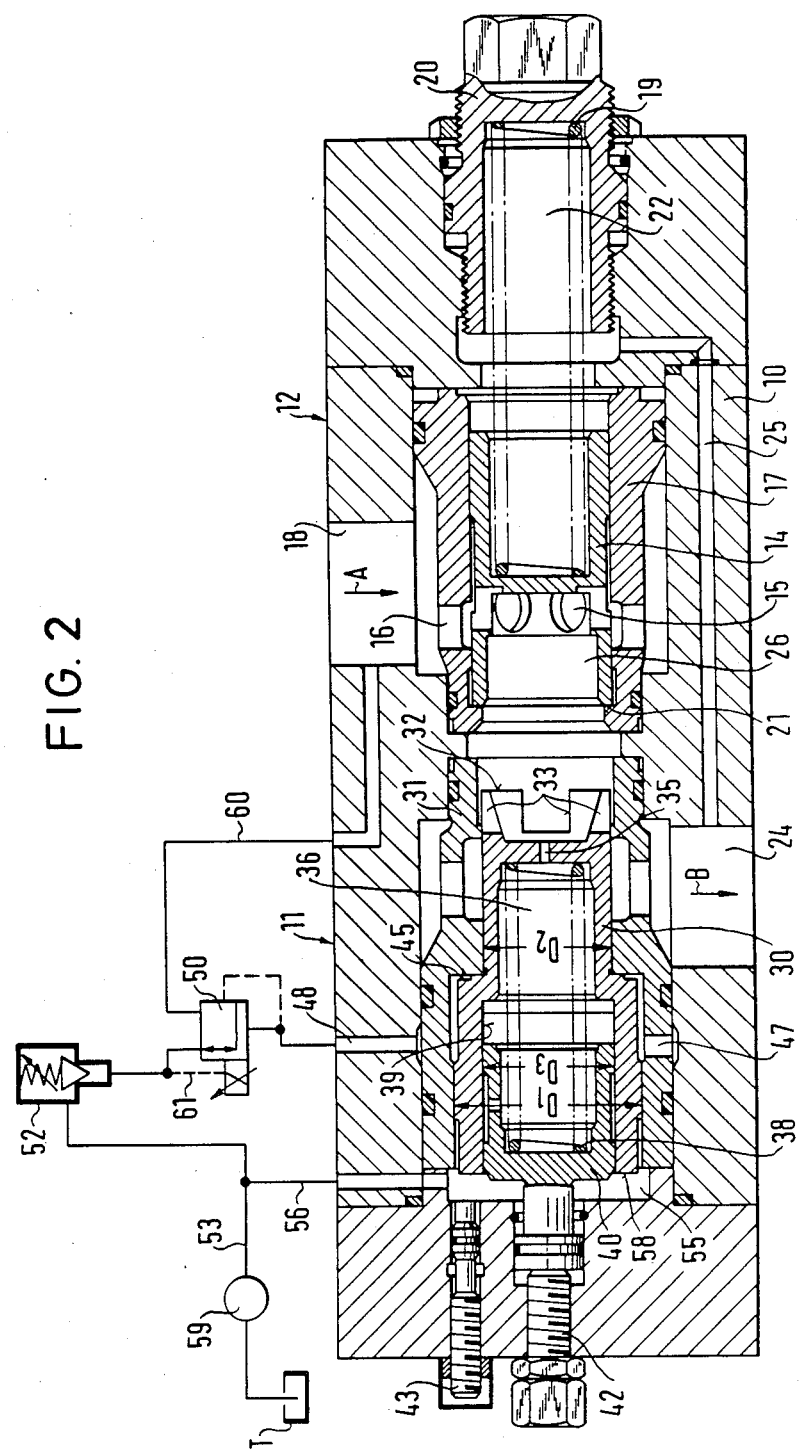

Such two-way throttle valves are known (Oelhydraulik und Pneumatik, Magazine for fluid technology, No. 8, August 1981, FIG. 2). The valve member governing the flow rate of the throttle valve is subjected in the opening sense to the inlet pressure and in the closure direction to a spring under the control pressure set at an electrically controlled pilot valve. This is thus a throttle valve with hydraulic pressure feedback.

On pressure fluctuations at the inlet or outlet of the throttle valve the position of the valve member can change if the pilot valve is unable to compensate the pressure fluctuations by corresponding variation of the control pressure. This is the case in particular with long conduits and large flow rates because large fluid volumes in such systems tend to execute oscillations which lead to corresponding pressure fluctuations.

SUMMARY OF THE INVENTION

The problem underlying the invention is therefore to construct the throttle valve in such a manner that instabilities arising on the basis of pressure fluctuations are eliminated.

Said problem is solved according to the invention by the features set forth in the characterizing clause of claim 1. Advantageous further developments according to the invention are characterized in the subsidiary claims.

It is thus possible according to the invention in a throttle valve with hydraulic pressure feedback to obtain a very high stability with pressure fluctuations without requiring electrical means.

In addition, the throttle valve may be preceded by a pressure balance. The pressure balance serves to keep the pressure in the outlet of the pressure valve, i.e. on the consumer side, and in the supply to the pressure balance at a constant pressure gradient. The assembly of throttle valve and pressure balance is as twin valve with valve member and control piston disposed in an axis so that a favourable constructional form with corresponding adjustment possibilities for the springs of the pressure balance and throttle valve is obtained.

Figure 1:
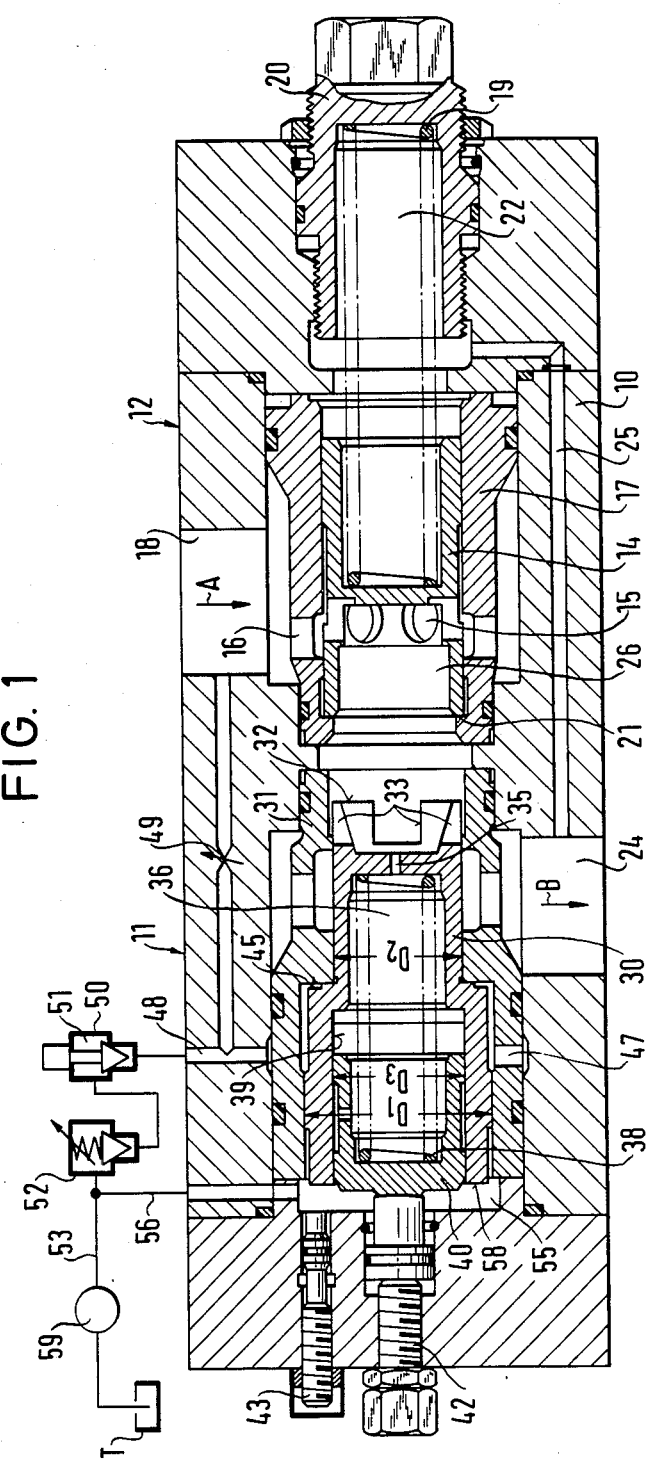
Figure 3:
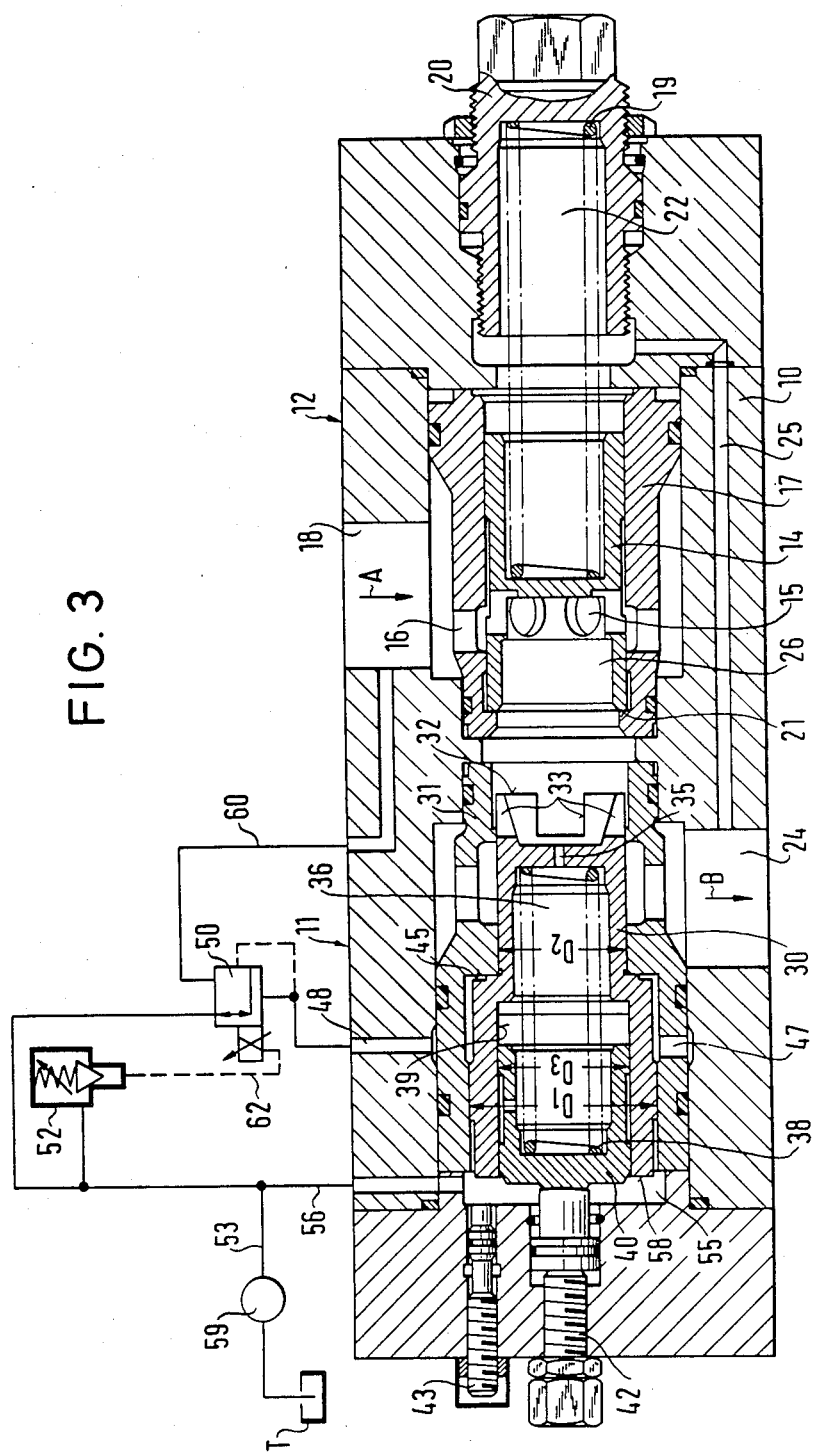

The examples of embodiment of the invention will be explained hereinafter in detail with the aid of the drawings, wherein:

FIG. 1 is a section through a proportional throttle valve with pressure balance and a pressure-limiting valve, FIG. 2 is a section similar to FIG. 1 with a pressure-limiting valve functioning as pilot valve and FIG. 3 is a section similar to FIG. 1 with a pilot-controlled pressure-reducing valve acting as pilot valve.

In a valve housing 10 from a respective end face a throttle valve 11 and a pressure balance 12 are installed. The pressure balance 12 is upstream from the throttle valve 11 and consists of a control piston 14 with bores 15 which are in connection with an inlet 18 via openings 16 formed in a bushing 17 that is disposed in the housing 10. The control piston 14 is urged into an opened, initial position against a stop 21 provided on the bushing 17 by a spring 19. The spring is adjustable from the outside of the valve housing 10 by means of a bushing 20. In a spring chamber 22 facing the control piston 14 the pressure in an outlet 24 acts via a line 25. The opposite face of the control piston 14 facing a chamber 26 is subjected to the output pressure of the pressure balance 12.

The throttle valve 11 consists of a valve member 30 which is displaceably mounted in a bushing 31 fitted in the housing 10. The front end face 32 of the valve member 30 is provided with orifices 33 via which fluid can flow from the chamber 26 into the outlet 24 when the valve member 30 is displaced from the initial position shown to the left. The output pressure of the pressure balance 12 obtain in the chamber 26 acts in the opening direction on the end face of the valve member 30 on an area defined by the diameter $D_2$.

A spring chamber 36 of the valve member is also subjected to the pressure in the chamber 26 via a bore 35. The face subjected to this pressure is defined by the inner diameter $D_3$ of the valve member 30. Since the diameters $D_2$ and $D_3$ are equal the pressures acting in the chambers 26 and 36 cancel each other out.

A spring 38 in the spring chamber 36 presses the valve member 30 in the closure direction. The spring 38 bears on a bushing 40 displaceably arranged in the bore 39 of the valve member 30. Via a screw 42 screwed to the housing 10 the bushing 40 and thus the force of the spring 38 acting in the closure direction is adjustable. The opening stroke of the valve member 30 is limited by a further adjustment screw 43.

The valve member 30 is stepped and comprises an annular control face 45. The space adjoining the control face 45 between the valve member 30 and the bushing 31 is connected via openings 47 in the bushing to a control line 48 which is connected via a flow regulator 49 to the inlet 18 and to a pilot valve 50. The control face 45 subjected to the control pressure is governed by the difference of the outer diameter $D_1$ and the diameter $D_2$ defining the end face of the valve member. The control pressure acting on the control face 45 acts in the opening direction of the valve member 30.

The pilot valve 50 is an electrically controllable proportional pressure-limiting valve whose discharge-side chamber 51 is connected via a spring-loaded pilot valve 52 to a line 53 which leads to the tank T and into which a line 56 opens leading from a chamber 55 at the back of the throttle valve.

Hereinafter the mode of operation of the throttle valve will be explained. Depending upon the control pressure set by the electrically adjustable pilot valve 50, the throttle valve varies the throttle cross-section between the chamber 26 and the outlet 24 and thus governs the flow rate. From the inlet 18 via the flow regulator 49 fluid is conducted to the pilot valve 50 and the pilot valve 52. The flow regulator 49 governs the fluid flow independently of the pressure gradient between the inlet 18 and the pilot valves 50 and 52. The pilot valve 52 is also a pressure-limiting valve which is set to the lowest possible pressure. The pressure-limiting valve 50 generates the control pressure acting on the control face 45 of the valve member in proportion to the electrical signal applied thereto.

The control pressure displaces the valve member in the opening direction until the force of the pressure spring 38 is equal to the hydraulic opening force of the control pressure. Since the force change of the pressure spring 38 is linear over the spring stroke the flow cross-section of the throttle valve is adjusted smoothly and proportionally to the desired value applied at the pilot valve 50. In the position defined by the magnitude of the control pressure, the valve member remains stationary. Because of the equal diameters $D_2$ and $D_3$ the valve member 30 itself is pressure-compensated and the position of said valve member 30 cannot be changed by pressure variations either in the inlet 18 or in the outlet 24. Such pressure fluctuations may be very considerable, particularly when large cross-sections and long lines are involved, i.e. large flow rates and volumes which are prone to low-frequency resonant oscillations and thus can cause considerable pressure fluctuations.

The annular face 45 of the valve member 30 subjected to the control pressure has the same area as the end face 58 of the valve member 30 facing the chamber 55. If pressure fluctuations occur in the line 53 leading to the tank T they are also compensated for because when the pressure changes in the line 53 this pressure change simultaneously acts on the end annular face 58 of the valve member 30 and on the discharge-side chamber of the pilot valves 50 and 52. As a result the control pressure in the line 48 on the control face 45 changes by the same pressure difference as the pressure on the annular face 58. Thus, the pressure change results in equisized hydraulic forces on the annular faces 45 and 58. Consequently the position of the valve member 30 is not changed. Such pressure fluctuations can occur in particular in long lines 53 which lead to the tank T and in which a filter 59 is frequently provided at the end so that corresponding dynamic pressure changes can occur.

On failure of the pilot valve 50 the control pressure can if necessary also be set by the pilot valve 52.

With the pressure balance 12 preceding the throttle valve 11, in spite of different loads from the sides of the consumer connected to the outlet 24 and of the fluid supply in the inlet 18 the flow rate through the throttle valve 11 and thus the operating speed of the consumer can be kept constant. The control piston 14 of the pressure balance is acted upon in the opening direction by the pressure of the spring 19 and the pressure (consumer pressure) existent at the outlet 24. The force acting on the control piston 14 in the closure direction comprises the output pressure in the chamber 26 which is equal to the input pressure of the throttle valve 11. If the outlet pressure increases the control piston 14 is adjusted in the opening direction so that the pressure in the chamber 26 also increases and thus the pressure gradient across the throttle cross-section remains constant. Conversely, the pressure gradient and thus the flow remain constant when the pressure in the outlet 24 diminishes by adjusting the control piston in the closure direction. In this case, the flow through the openings 14, 15 is throttled and thus the pressure in the chamber 26 reduced until the same pressure gradient again obtains at the throttle valve 11.

If the pressure in the inlet 18 rises the pressure in the chamber 26 will also increase and the control piston 14 moves in the closure direction, thus greatly thottling the flow via the openings 14 and 15. The pressure in the chamber 26 and thus also the pressure gradient across the throttle valve remain constant. If the pressure in the inlet 18 falls the pressure in the chamber 26 also falls. The control piston 14 moves in the opening direction so that the flow via the openings 14 and 15 is unthrottled. The pressure in the chamber 26 and thus the pressure gradient across the throttle valve remain constant.

The pressure of the spring 19 is adjustable via a threaded bushing 20 which is disposed on the end face of the valve housing 10 opposite the adjustment screws 42 and 43. The constructional principle of pressure balance and throttle valve in the one axis illustrated in the drawing permits a favourable constructional form. The adjustment means can be arranged for adjusting the maximum stroke and the orifice opening begin of the throttle valve and the pressure gradient of the pressure balance externally of the valve body.

In FIG. 2 instead of the proportional pressure-limiting valve as pilot valve, an electrically controlled proportional pressure-reducing valve is provided. This valve comprises a three-way pressure-reducing valve whose input-side connection is connected directly via a line 60 to the inlet 18. The discharge-side connection of this valve is connected via the pilot valve 52 to the tank line the valves controlled connection is connected to the control line 48. The flow regulator 49 is dispensed with. The control pressure in the control line 48 acts on the control piston of the pressure-reducing valve in the opposite sense to the force exerted by the proportional magnet.

To compensate for changes in the adjustment of the valve member 30 caused by pressure fluctuations in the tank line 53 the pressure set by the pressure-reducing valve 50 must be correspondingly variable. For this purpose the tank pressure is led at the discharge-side connection of the pressure-reducing valve via a line 61 to the control piston of the pressure-reducing valve 50 and acts against the control pressure. Accordingly the tank line pressure is added to the control pressure for pressure compensation of the valve member.

In FIG. 3 the electrically controlled proportional pressure-reducing valve 50 is pilot-controlled. As the pilot control valve the pilot valve 52 is used. The tank line 53 is thus connected directly to the discharge-side connection of the pilot valve 50. The control pressure in the line 48 is opposed by the pilot pressure which is led via the line 62 from the pilot valve 52 to the pressure-reducing valve 50. Thus tank line pressure and control pressure are summed up to obtain compensation.

I claim:

1. Proportional throttle valve for a system having an inlet pressure line, a supply line, and a return tank pressure line, said throttle valve comprising an inlet communicating with said inlet pressure line, an outlet communicating with said supply line, a valve member for regulating the area of a throttle cross-section between said inlet and said outlet, said valve member having a first end face subjected to the inlet pressure in said inlet for urging said valve member in an opening direction, said valve member defining a spring chamber, a spring disposed in said spring chamber of said valve member, said spring urging said valve member in a closure direction, said valve member defining a control face formed by an annular face of said valve member and a pilot valve interposed between said inlet pressure line and said return tank pressure line for setting a control pressure acting on said control face of the valve member in said opening direction, and means for transmitting inlet pressure in said closure direction on a second face of said valve member remote from said first end face and of equal area, characterized in that said valve member is formed with a ring face remote from said annual control face and contained within a space remote from said annual control face and, means communicating said space with the return tank pressure line connection of said pilot valve so that return tank pressure is applied in said space.

2. Throttle valve according to claim 1, characterized in that the spring is supported at a bushing slidably disposed in the valve member, the preload of said spring being adjustable at an end face of the valve housing.

3. Throttle valve according to claim 1, characterized in that the maximum stroke of the valve member is adjustable.

4. Throttle valve according to claim 1, characterized in that the spring chamber of the valve member is connected via a bore in the valve member to the inlet chamber.

5. Throttle valve according to claim 1, characterized in that the control face of the valve member is defined by two outer diameters ($D_1-D_2$) of the valve member and the annular face is defined by the difference between the outer diameter ($D_1$) and the inner diameter ($D_3$), and $D_1-D_2=D_1-D_3$ and $D_2=D_3$.

6. Throttle valve according to claim 1, characterized in that the pilot valve is an electrically controllable proportional pressure-limiting valve.

7. Throttle valve according to claim 6, characterized in that a flow regulator is located in the supply line leading from the inlet to the control face.

8. Throttle valve according to claim 1, characterized in that the pilot valve is an electrically controllable proportional pressure-reducing valve.

9. Throttle valve according to claim 1, characterized in that the discharge-side connection of the pilot valve is connected via spring-loaded pilot valve to the return tank pressure line and the space.

10. Throttle valve according to claim 8, characterized in that the pressure-reducing valve is pilot controlled.

11. Throttle valve according to claim 10, characterized in that as pilot control valve, a pilot valve is provided, and the tank line is connected to the discharge-side connections of the two pilot valves.

12. Throttle valve according to claim 2 having a pressure balance valve for load pressure compensation, characterized in that a control piston of the pressure balance valve is arranged coaxially in front of the valve member, the output pressure generated by said control piston acts on a housing chamber between said control piston and said valve member and the outlet pressure of said throttle valve acts on a face of said control piston opposite a face acted on by output pressure of the pressure balance valve and at which end an adjustable spring is supported.

* * * * *